United States Patent [19]

Shephard

[11] Patent Number: 5,566,919
[45] Date of Patent: Oct. 22, 1996

[54] MOTOR MOUNT FOR REDUCING VIBRATION AND NOISE AND METHOD OF USING THEREOF

[75] Inventor: Larry E. Shephard, West Warwick, R.I.

[73] Assignee: Norfolk Scientific, Inc., Norwood, Mass.

[21] Appl. No.: 322,597

[22] Filed: Oct. 13, 1994

[51] Int. Cl.$^6$ .................................................. F16M 13/00
[52] U.S. Cl. .......................... 248/604; 267/160; 248/632; 248/638; 248/150
[58] Field of Search ..................................... 248/604, 603, 248/605, 632, 634, 638, 154, 519, 523; 267/158, 160, 161

[56] References Cited

U.S. PATENT DOCUMENTS

| | | | |
|---|---|---|---|
| 2,006,960 | 7/1935 | Mitchell | 248/638 X |
| 3,730,509 | 5/1973 | Jorn | 267/152 |
| 3,765,600 | 10/1973 | Steimel | 233/20 R |
| 3,804,324 | 4/1974 | Sinn et al. | 233/24 |
| 4,007,924 | 2/1977 | Jorn et al. | 267/57.1 R |
| 4,201,066 | 5/1980 | Nolan, Jr. | 64/1 V |
| 4,226,359 | 10/1980 | Jacobson | 233/24 |
| 4,253,634 | 3/1981 | Daniels | 248/604 |
| 4,269,400 | 5/1981 | Jensen | 248/632 X |
| 4,303,193 | 12/1981 | Latham, Jr. | 233/23 A |
| 4,323,217 | 4/1982 | Dochterman | 248/604 |
| 4,412,831 | 11/1983 | Avery et al. | 494/46 |
| 4,572,472 | 2/1986 | Eder | 248/603 X |
| 4,584,928 | 4/1986 | Haynes | 92/161 |
| 4,640,105 | 2/1987 | Kushner et al. | 68/23.3 |
| 4,692,136 | 9/1987 | Feldman et al. | 494/38 |
| 4,759,526 | 7/1988 | Crawford et al. | 248/604 |
| 4,768,925 | 9/1988 | Geupel | 248/604 X |
| 4,795,419 | 1/1989 | Yawn et al. | 494/84 |
| 4,819,439 | 4/1989 | Higham | 62/6 |
| 4,822,174 | 4/1989 | Deibel | 366/279 |
| 4,822,331 | 4/1989 | Taylor | 494/16 |
| 4,846,773 | 7/1989 | Giebeler et al. | 494/82 |
| 4,913,696 | 4/1990 | Romanauskas et al. | 494/10 |
| 5,044,598 | 9/1991 | Mann et al. | 248/638 |
| 5,069,413 | 12/1991 | Carson et al. | 248/638 |
| 5,069,415 | 12/1991 | Mechalas | 248/604 X |
| 5,104,100 | 4/1992 | Simuttis | 267/240.1 |
| 5,121,905 | 6/1992 | Mann et al. | 267/141.4 |
| 5,221,078 | 6/1993 | Hartel et al. | 267/140.14 |
| 5,307,567 | 3/1994 | Schanke et al. | 34/319 |

FOREIGN PATENT DOCUMENTS

| | | | |
|---|---|---|---|
| 1174630 | 7/1964 | Germany | 248/632 |
| 494973 | 11/1938 | United Kingdom | 248/603 |
| 2043828 | 10/1980 | United Kingdom | 267/158 |

*Primary Examiner*—Alvin C. Chin-Shue
*Assistant Examiner*—Brian J. Hamilla
*Attorney, Agent, or Firm*—Weingarten, Schurgin, Gagnebin & Hayes

[57] ABSTRACT

A motor mount for reducing vibration and noise associated with motor load imbalances. The mount includes a one-piece elastomeric support having a motor attachment portion from which a plurality of supporting legs extend. Prior to assembly, the amount has a planar configuration. In assembly, the motor attachment portion is positioned around and secured to the motor by a clamp. Brackets are provided to secure the legs to a base. The mount provides the motor with pivotal freedom of motion but prevents substantial vertical displacement of the motor. The motor mount is well suited for use in centrifuges and other apparatus in which load imbalances cause vibration. In one embodiment, the mount includes three legs so that, in assembly, the mount is tripod-like.

9 Claims, 4 Drawing Sheets

MOTOR MOUNT FOR REDUCING VIBRATION AND NOISE AND METHOD OF USING THEREOF

FIELD OF THE INVENTION

This invention relates generally to motor mounts and more particularly, to a motor mount well suited for use in a centrifuge for reducing vibration and noise.

BACKGROUND OF THE INVENTION

Centrifuges used to separate components of different densities are known. During centrifugation, samples contained in tubes are spun at relatively high rates of speed. The resulting centrifugal forces on the samples cause denser material to move to the bottom of the tube. For example, in the case of a blood sample, the red blood cells move to the bottom of the tube, white blood cells form a layer over the red blood cells, and plasma forms a layer over the white blood cells. Other types of samples will form small pellets at the bottom of the tube.

Generally, centrifugation apparatus includes an electromechanical spinner having a bowl in which a rotor is disposed for rotation by a motor. The rotor includes a retention mechanism for restraining a plurality of tubes. One type of rotor is a "swinging bucket" type, in which the retention mechanism pivotably supports the tubes. With this arrangement, the tubes are loaded into the rotor in a substantially vertical position, but are free to swing outward in response to centrifugal forces so that resulting constituent layers or pellets are oriented substantially vertically in the tube. Another type of rotor is a fixed angle rotor, in which the retention mechanism supports the tubes at a fixed angle of inclination.

Under certain operating conditions, the load on the motor (i.e., the mass associated with the rotor, tubes, and fluid specimens) may be non-uniformly distributed around the circumference of the rotor. Such a non-uniform load distribution causes greater centrifugal forces at the circumferential location of the rotor with the greatest load mass.

Conventional rigid attachment of the motor to the spinner housing permits imbalanced centrifugal forces to be readily coupled to the housing in the form of vibration. Vibration in turn, disadvantageously results in accelerated motor wear and higher operating noise levels. Moreover, pivotal forces on the motor load resulting from imbalanced centrifugal forces tend to strain the motor shaft, thereby further accelerating motor wear. Other types of motorized apparatus in which motor load imbalances cause vibration suffer similar drawbacks from rigid motor attachment.

SUMMARY OF THE INVENTION

In accordance with the invention, a motor mount includes an elastomeric support having a motor attachment portion and a plurality of supporting legs extending from the motor attachment portion. In assembly, the motor attachment portion is positioned around the motor and a clamp, disposed around the motor attachment portion, compresses the motor attachment portion against the motor to firmly secure the motor to the mount. Brackets are provided to secure each of the legs to the base so as to "suspend" the motor over the base.

In one embodiment, a centrifuge is provided with the motor mount. The centrifuge has a housing disposed over and fastened to the base and a bowl disposed within the housing. A motor supported by the mount has a shaft extending into the bowl for coupling to a rotor. The rotor includes a retention mechanism for retaining a plurality of tubes for centrifugation.

Preferably, the elastomeric support includes three legs, so that the mount is tripod-like. This arrangement is advantageous due to the inherent self-levelling characteristic of a tripod. Additional benefits of providing the support with three legs are the manufacturing simplicity associated with use of fewer supporting legs and the reduced parts count associated with attaching fewer legs to the base.

Use of the elastomeric support effectively isolates vibration attributable to load imbalances from the base and housing. Stated differently, the flexible support provided by the mount serves to damp forces that would otherwise be transferred to the housing in the form of vibration. In this way, the mount provides the centrifuge with reduced vibration, noise, and motor wear rate, as compared to rigid attachment of the motor to the base.

Moreover, the vibrational isolation and associated benefits are achieved with a motor mount that is relatively flexible in response to pivoting forces on the motor/rotor subassembly and relatively stiff in response to vertical forces on the subassembly. The pivotal flexibility of the support enhances the vibration damping ability of the mount by permitting the mount to accommodate, or absorb greater load imbalances. Moreover, such pivotal flexibility reduces strain otherwise exerted on the motor shaft, thereby further reducing the motor wear rate. Vertical stiffness is desirable so that, when an operator loads tubes into the rotor, the motor/rotor subassembly is not readily displaced downward.

BRIEF DESCRIPTION OF THE DRAWINGS

The foregoing features of this invention, as well as the invention itself, may be more fully understood from the following detailed description of the invention in which.

DESCRIPTION OF THE PREFERRED EMBODIMENT

Figure 1:
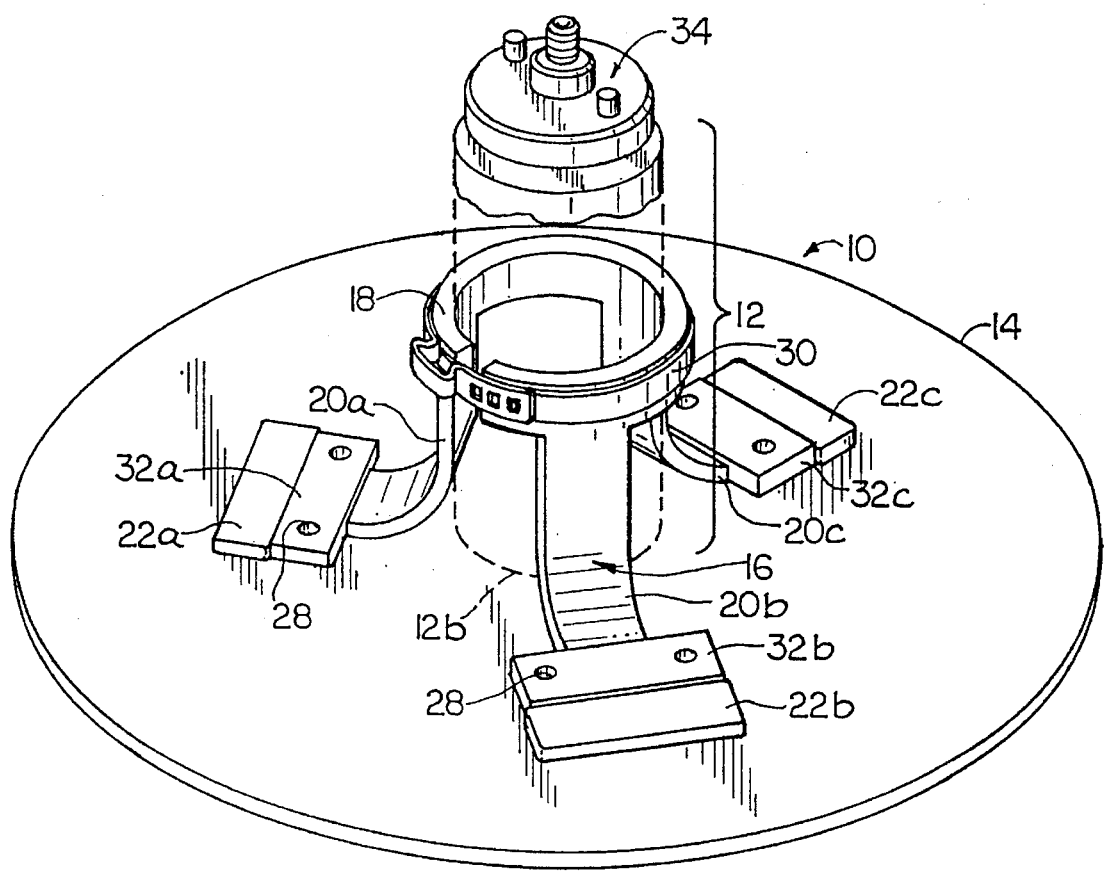
FIG. 1 is an isometric view of a motor mount in accordance with present invention.

Referring, to FIG. 1, a motor mount 10 for mounting a motor 12 to a base 14 is shown to include an elastomeric support 16. The support 16 has a motor attachment portion 18 and a plurality of legs 20a–c, each one extending from the motor attachment portion 18 to terminate at a foot 22a–c, respectively. The motor attachment portion 18 is adapted for securing to the motor 12 and the legs 20a–c are adapted for securing to the base 14, as will be described.

In assembly, the motor 12 is flexibly supported over the base 14 by the elastomeric support 16 so that the motor 12 is neither 14 rigidly coupled to the base 14, nor in direct contact with the base 14. Rather, the mount 10 "suspends" the motor 12 over the base 14 with a predetermined clearance between the bottom end 12b of the motor 12 and the base 14. With this arrangement, forces attributable to motor load imbalances are decoupled from the base 14 and from any apparatus (not shown) attached to the base 14. More particularly, the elastomeric support 16 effectively isolates the motor 12 from the base 14 by damping, or absorbing forces that would otherwise cause vibration. The reduction in vibration concomitantly reduces the noise level associated with the motor operation and also reduces motor wear otherwise aggravated by vibration.

Figure 6:
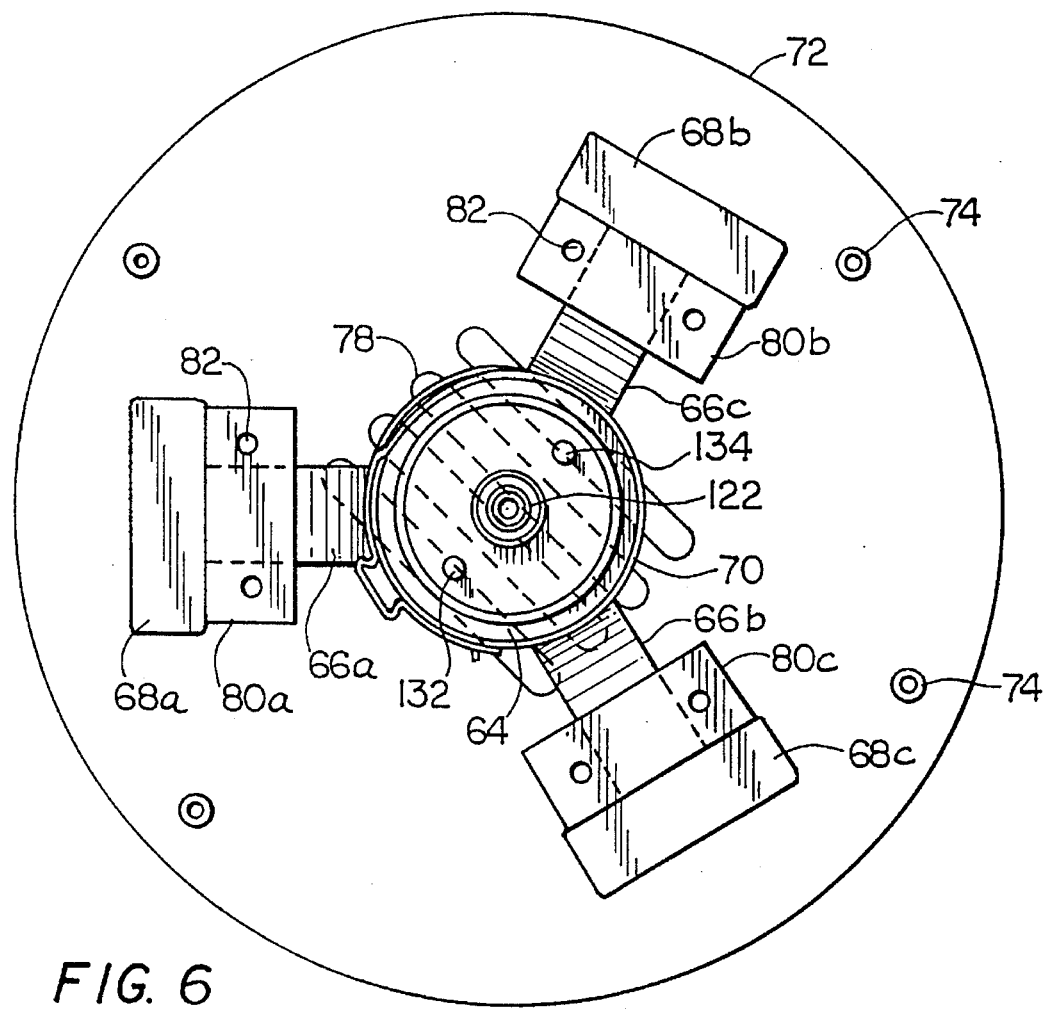
FIG. 6 is a top view of the centrifuge apparatus of FIGS. 4 and taken along line 6—6 of FIG. 5.
Figure 4:
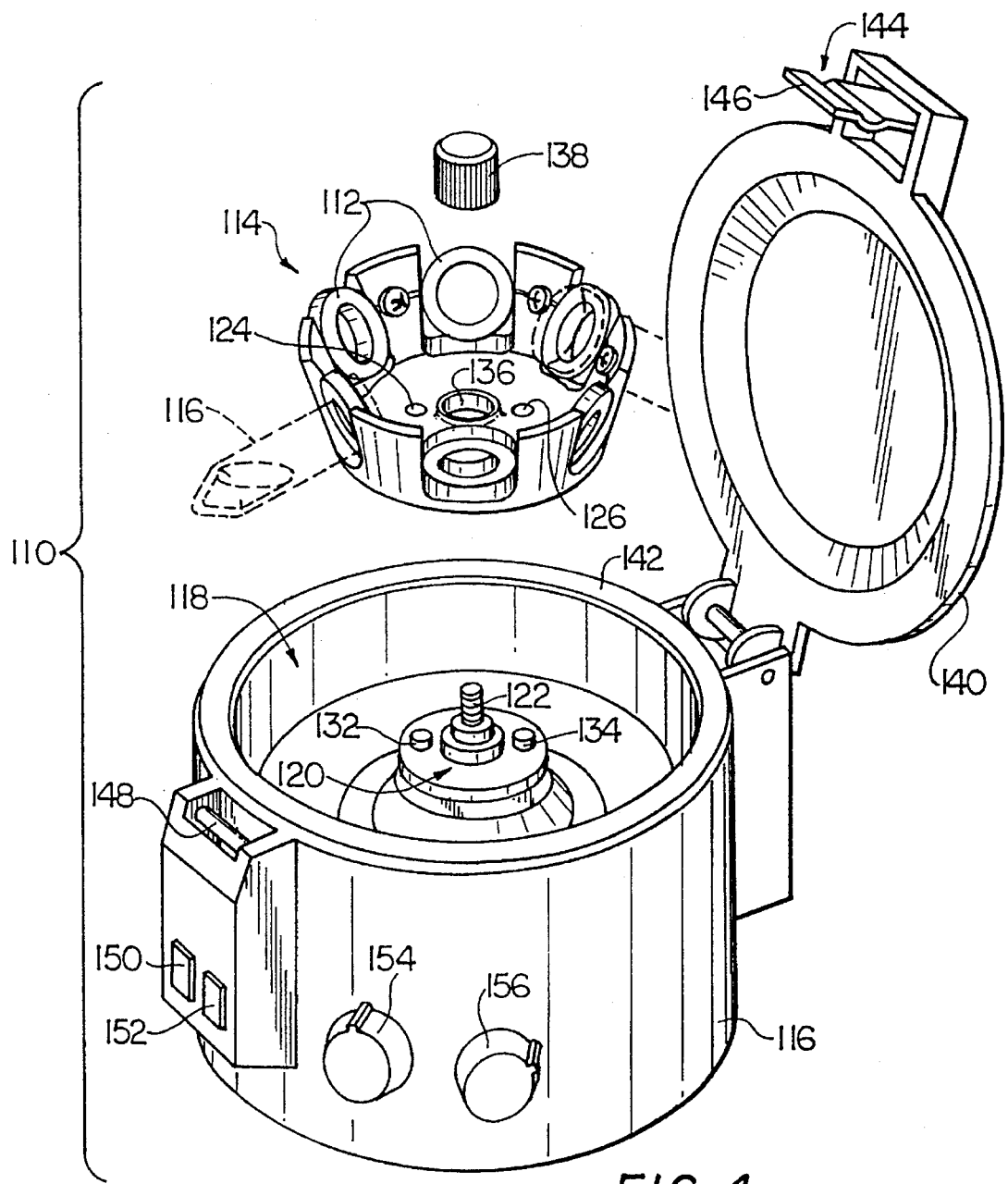
FIG. 4 is an exploded isometric view of centrifuge apparatus utilizing a motor mount in accordance with the present invention.
Figure 5:
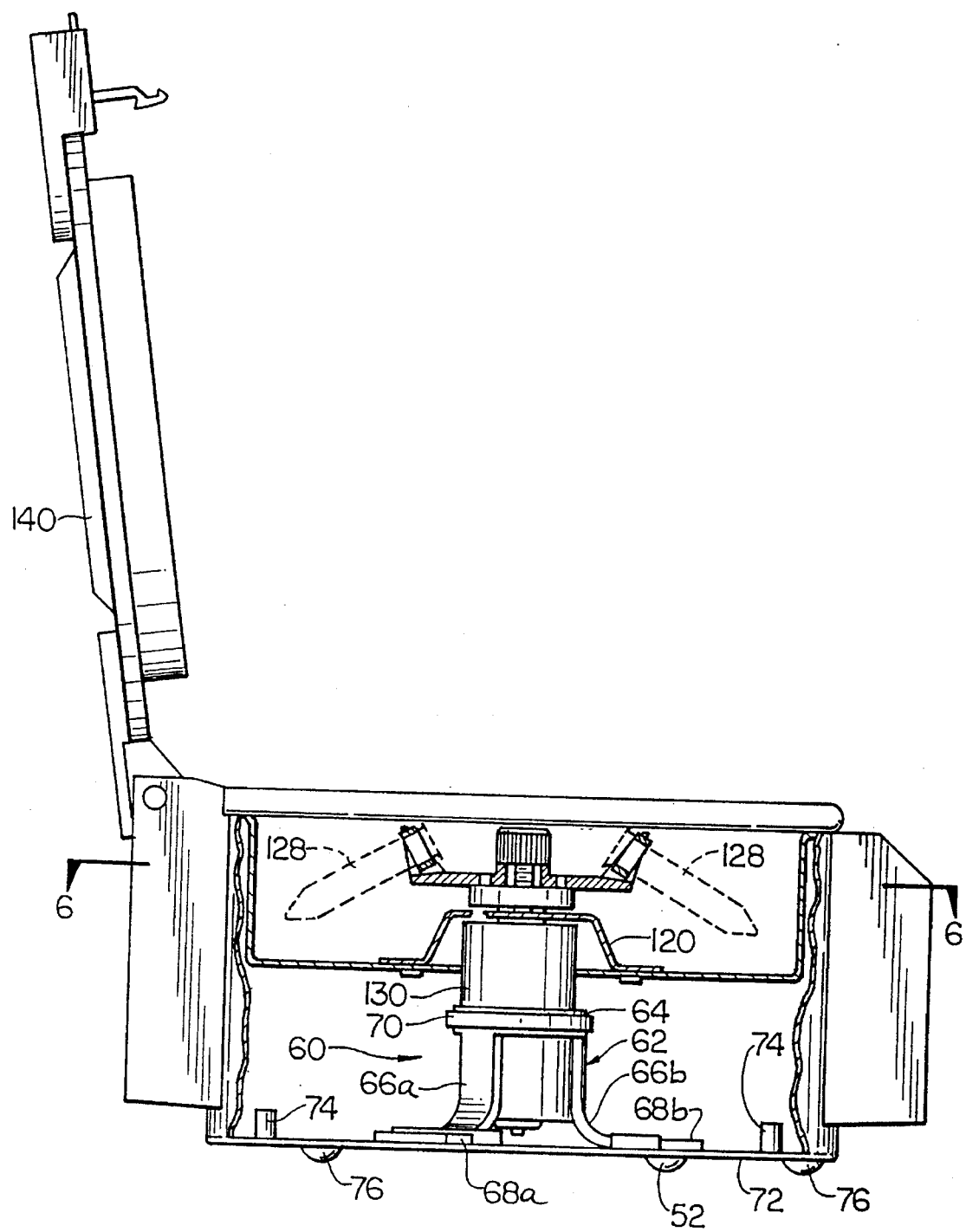
FIG. 5 is an elevational view of the centrifuge apparatus of FIG. 4 in partial cross-section.

The motor 12 has a shaft (not shown) extending from a top end thereof to engage a rotor mount 34 which, in turn, is adapted for engaging a load. In one embodiment, the motor load is the rotor of a centrifuge (FIGS. 4–6). The motor mount 10 provides relative vertical stiffness and pivotal flexibility to the motor/load subassembly. Providing the motor/load subassembly with pivotal flexibility further reduces vibration by permitting larger imbalanced loads to be accommodated and also reduces motor wear rate by reducing stresses on the motor shaft otherwise caused by imbalanced centrifugal forces. The vertical stiffness associated with the motor mount 10 advantageously prevents the motor/load subassembly from substantial vertical displacement when the load is being attached to, or removed from the motor, as will become apparent from the discussion of the illustrative centrifuge of FIGS. 4–6. The degree of pivotal flexibility of the motor can be tailored in accordance with a particular application. It will be appreciated that factors affecting the flexibility of the support 16 include the particular elastomeric material comprising the support, the specified range of loads and load imbalances to be accommodated, the weight of the motor 12 and load, the speed of rotation of the motor 12, the dimensions of the support 16, the position of attachment of the motor mount 10 to the base 14 and the height at which the motor 12 is disposed relative to the base 14.

The elastomeric support 16 of the illustrative embodiment has three legs 20a–c, so that the motor mount 10 is tripod-like. This arrangement is desirable due to the inherent self-levelling characteristic of tripods, as well as the reduced manufacturing complexity and cost associated with the use of fewer legs. The support 16 is removably attached to the motor 12 by a clamp 30 which fits over the motor attachment portion 18 of the support 16 in assembly. Actuation of the clamp 30 compresses the annular portion 18 around the motor 12 to firmly secure the motor 12 to the support 16, as will be described further in conjunction with FIG. 3.

The support 16 is attached to the base 14 by a plurality of brackets 32a–c, each one corresponding to one of the supporting legs 20a–c. More particularly, each of the supporting legs 20a–c terminates at a corresponding foot 22a–c having a width greater than the width of the corresponding leg 20a–c (see also FIG. 2). Brackets 32a–c straddle corresponding legs 20a–c adjacent to the corresponding foot 22a–c and are fastened to the base 14 by fasteners 28, as shown. In this way, the support 16 is secured to the base 14 with the motor 12 "suspended" over the base 14.

Figure 2:
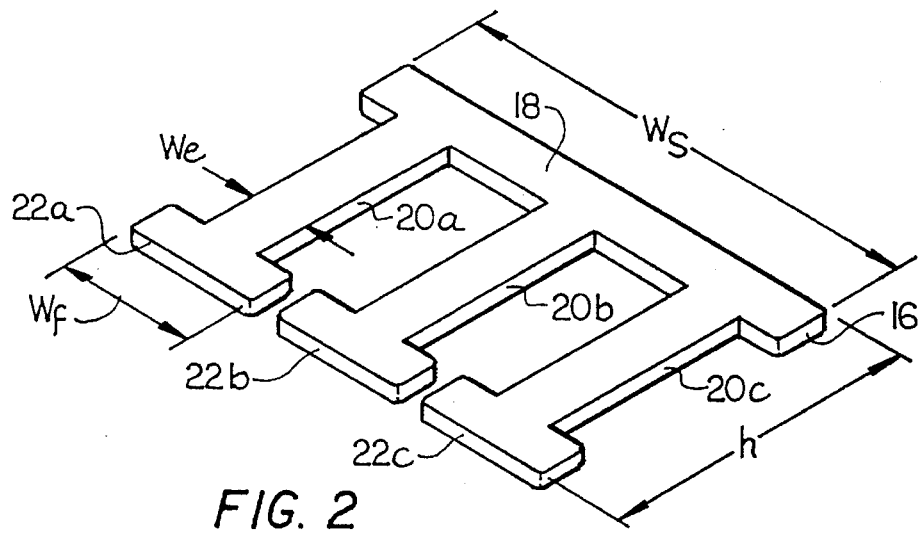
FIG. 2 is an isometric view of the elastomeric support of the motor mount of FIG. 1.

Referring also to FIG. 2, an isometric view of the elastomeric support 16 is shown prior to assembly. Support 16 is fabricated from a flat sheet of elastomer by any suitable technique, such as molding or die cutting. Thus, the motor attachment portion 18 is shown flat, prior to being wrapped around, and secured to the motor 12 in assembly. In assembly, the motor attachment portion 18 is disposed concentrically around the motor 12 in a substantially annular arrangement, as shown in FIG. 1. Supporting legs 20a–c extend from the motor attachment portion 18 and terminate at feet 22a–c, respectively.

As noted above, the elastomeric material of support 16 is one of the factors affecting the flexibility of the mount 10. Thus, the elastomer is selected in accordance with the desired vertical and pivotal flexibilities and the resulting degrees of vertical and pivotal freedom of motion of the motor/load subassembly. Various types of elastomeric materials are suitable for fabrication of the support 16, such as ISODAMP® C-1000 manufactured by E-A-R Specialty Composites of Indianapolis, Ind.

As noted above, each of the feet 22a–c has a width "$W_f$" greater than the width "$W_1$" of the corresponding leg 20a–c, respectively, as shown. This arrangement is advantageous since it permits a simple attachment scheme to be employed to attach the support 16 to the base 14. Specifically, brackets 32a–c are positioned across legs 20a–c adjacent to the feet 22a–c (FIG. 1), respectively, for fastening to the base 14 by fasteners 28, such as screws. The base 14 has apertures through which the fasteners 28 extend to engage self-tapped apertures in the brackets 32a–c. In assembly, the legs 20a–c are prevented from moving by vertical forces exerted by the fastened brackets 32a–c on the legs 20a–c, respectively. To this end, the portion of the legs 20a–c disposed under the brackets 32a–c, respectively, in assembly, may be slightly compressed when the fasteners 28 are tightened.

The brackets 32a–c may be comprised of any material having suitable strength, such as various plastics. It will be appreciated however, that various other types of attachment schemes are possible for attaching the support 16 to the base 14 without departing from the spirit of the invention.

In the illustrative embodiment, the overall height "h" of the support 16 (i.e., from the top of the motor attachment portion 18 to the bottom of feet 22a–c) is approximately 2.4 inches. In assembly however, the supporting legs 22a–c are bent adjacent to the feet 22a–c for attachment to the base 14, as shown. The portion 18 is disposed around the motor 12 so that the motor 12 is suspended over the base 14 with a clearance between the motor bottom 12b and the base 14 of between approximately 0.125–0.25 inches. The width "$W_s$" of the support 16 is approximately 4.5 inches. It will be appreciated however, that the dimensions of the support 16 will vary in accordance with application particulars, such as motor size.

Figure 3:
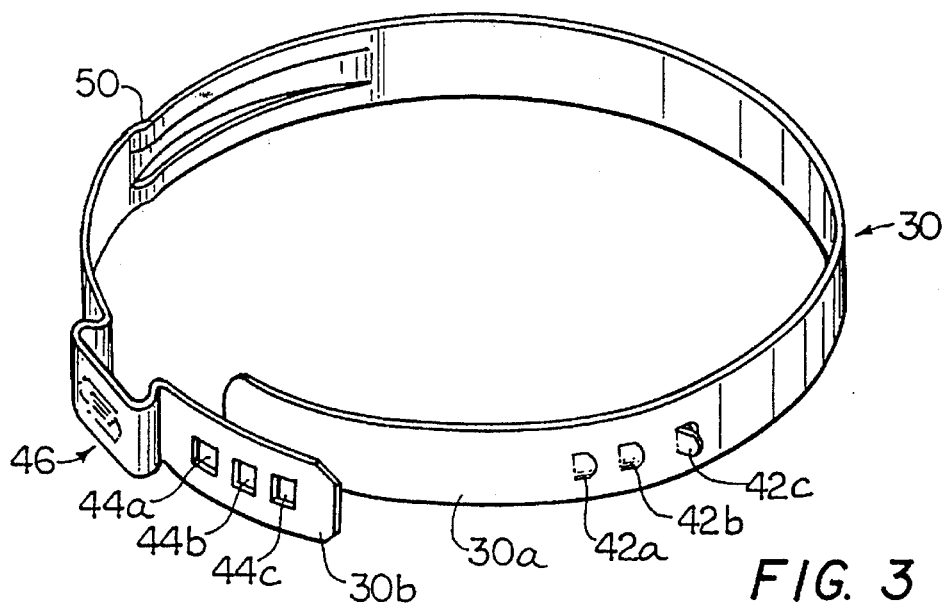
FIG. 3 is an isometric view of the clamp of the motor mount of FIG. 1.

Referring also to FIG. 3, an isometric view of the clamp 30 is shown. The clamp 30 includes a locking mechanism comprising a plurality of slightly protruding teeth 42a–c located at one end 30a of the clamp 30, a complementary plurality of mating apertures 44a–c located at the opposing clamp end 30b, and a deformable portion 46. In assembly, the motor attachment portion 18 of the support 16 is wrapped around the motor 12 and the clamp 30 is held around the annular portion 18 so that the second clamp end 30b overlaps the first clamp end 30a with the apertures 44a–c aligned with the teeth 42a–c, respectively. The apertures 44a–c are brought into engagement with the teeth 42a–c and the portion 46 is deformed to tighten the clamp 30. With the clamp 30 thus engaged, the annular portion 18 of the support 16 is compressed around the motor 12.

The clamp 30 includes a depression 50 disposed adjacent to the deformed portion 46. In assembly, when the clamp 30 is engaged, depression 50 compresses the adjacent annular motor attachment portion 18. This arrangement ensures that the entire motor attachment portion 18 is substantially uniformly compressed so as to maintain the motor 12 securely within the mount 10.

The clamp 30 is a commercially available component, such as a Stepless Ear Clamp manufactured by Oetiker of Livingston, N.J. It will be appreciated however, that various attachment schemes for securing the support 16 to the motor 12 are possible without departing from the spirit of the invention.

Referring to FIG. 4, an exploded isometric view of centrifugation apparatus 110 which utilizes a motor mount 60 (shown in FIGS. 5 and 6) of the type described above in conjunction with FIGS. 1–3 is shown. The centrifugal spinner 110 includes a housing 116 having a central depression, or bowl 118 adapted to receive a rotor 114 for rotation. The rotor 114, in turn, is adapted to support tubes 128 containing specimens, such as blood, for centrifugation. More particularly, a rotor mount 120, coupled to a shaft (not shown) of a motor 130 (FIGS. 5 and 6), is adapted for removable attachment to the rotor 114. The rotor 114 includes a pair of indexing holes 124, 126 for engaging complementary indexing pins 132, 134 extending upward from the rotor mount 120 to align the rotor 114 in the bowl 118. In assembly, a threaded portion 122 of the rotor mount 120 extends through a central aperture 136 of the rotor 114. The rotor 114 is secured to the threaded portion 122 with a threaded rotor hold-down cap 138 which engages the threaded rotor mount portion 122.

The illustrative rotor 114 of FIG. 4 includes six retention rings, collars, or trunnions 112 for receiving up to six tubes 128 for centrifugation. The rotor 114 is a "swinging bucket" type, so that the collars 112 are pivotably supported in the rotor 114. With this arrangement, the tubes 128 are loaded into the rotor 114 in a substantially vertical position, but are free to swing outward in response to centrifugal forces during rotation. It will be appreciated that other types of rotors may be utilized in conjunction with the centrifuge 110, such as the fixed angle rotor 114' described below in conjunction with FIG. 4A. Moreover, various centrifuge applications are possible, such as routine pelleting of particles, rapid spins, phase separations, simultaneous mixing of reagents and for use with filter devices as well as moving liquid through a mini-column.

In order to minimize load imbalances, it is desirable to balance the motor load to the extent possible by symmetrically loading the rotor 114. To this end, the centrifuge 110 accommodates two, three, four, or six tubes 128 positioned symmetrically around the rotor 114. In practice however, the load may not always be balanced, for example due to either asymmetrical tube placement or unequal loading of samples. The motor mount of the present invention significantly reduces vibration due to load imbalances as well as associated noise and motor wear. These benefits are achieved with the use of the above described elastomeric support which damps forces otherwise causing vibration.

A lid 140 is provided to cover the bowl 118 and the rotor 114 contained therein during centrifugation. The spinner bowl 118 is sealed by a gasket 142 disposed around the perimeter of the bowl 118 and compressed by the lid 140 in closure. A latch mechanism 144 securely latches the lid 140 in a closed position over the spinner bowl 118 and includes a latch lever 146 coupled to the lid 140 and a latch pin 148 coupled to the spinner housing 116. The latch mechanism 144 is operable for manual latching and unlatching of the lid 140 and may also include an electrically operable automatic lock feature for preventing operation of the centrifuge 110 when the lid 140 is not completely closed and latched and for preventing the lid 140 from being opened during centrifugation.

The centrifugal spinner 110 has several conventional controls including a start button 150 which initiates a pre-timed centrifugation cycle at a pre-selected speed and a stop button 152 which interrupts the cycle by stopping centrifugation and which may release a latch mechanism 144. Additional controls include a time selector 154 for selecting the duration of centrifugation and a speed selector 156 for selecting the speed of rotation, such as between approximately 1000 and 13,000 rpm. The motor 130 has terminals (not shown) for connection to a power source and the speed selector 156. The illustrative spinner 110 has a height of approximately 4.5 inches, a diameter of approximately seven inches, and a weight of approximately five pounds.

Figure 4A:
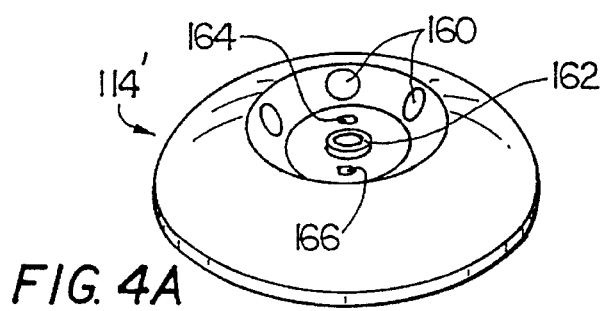
FIG. 4A is an isometric view of an alternate rotor for use with the centrifuge apparatus of FIG. 4.

Referring also to FIG. 4A, an alternate rotor 114' of the fixed angle type is shown. Rotor 114' may be used in place of rotor 114 in conjunction with the centrifuge apparatus 110 of FIG. 4. Rotor 114' comprises a plurality of apertures 160 adapted for receiving tubes 128 and retaining the tubes 128 at a fixed angle of inclination for centrifugation. Like rotor 114, rotor 114' has a central aperture 162 through which the threaded portion 122 of the rotor mount 120 extends in assembly. Rotor 114' further has a pair of indexing holes 164, 166 for engaging complementary indexing pins 132, 134 extending upward from the rotor mount 120 to align the rotor 114' in the bowl 118.

Referring also to the views of FIGS. 5 and 6, the motor mount 60 is shown positioned within the centrifuge housing 116 to support the motor 130. As described above in conjunction with like motor mount 10 of FIGS. 1–3, the motor mount 60 includes an elastomeric support 62 having an annular motor attachment portion 64 and three legs 66a–c extending from the motor attachment portion 64 to terminate at corresponding feet 68a–c, respectively. A clamp 70 secures the support 62 to the motor 130, so as to flexibly support the motor 130 above the base 72, in the manner described above. Brackets 80a–c are provided to secure legs 66a–c, respectively, to the centrifuge base 72. To this end, fasteners 82 are disposed through apertures in the base 72 and the brackets 80a–c (FIG. 6).

The spinner housing 116 is disposed over and attached to the base 72. The base 72 has a plurality of threaded channels 74 for fastening the spinner housing 116 to the base 72. Additional features of the centrifuge base 72 include rubber standoffs 76 and air vents 78 (FIG. 6) extending through the base 72 under the motor 130 to permit air flow in the spinner housing 116. The motor mount 60, and specifically the elastomeric support 62, has the same dimensions as the illustrative embodiment of FIGS. 1–3.

With this arrangement, an improved centrifuge 110 is provided with reduced operational vibration and concomitantly reduced noise and motor wear rate. These advantageous results are achieved with the use of the tripod-like elastomeric support 62 which effectively isolates, or damps forces causing vibration, generally resulting from load imbalances, from the base 72 and thus, also from the spinner housing 116 attached to the base 72.

Moreover, the motor mount 60 provides vibrational isolation and associated benefits while also permitting the motor/rotor subassembly to flex in response to the pivotal forces and preventing substantial vertical displacement in response to vertical forces, such as may occur when tubes 128 are loaded into the rotor 114. The relative pivotal flexibility of the mount 60 permits the accommodation of greater load imbalances and additionally reduces stresses on the motor shaft otherwise resulting from such pivotal forces.

Having described the preferred embodiments of the invention, it will be apparent to one of skill in the art that other embodiments incorporating their concepts may be used.

For example, in certain applications, it may be desirable to provide the elastomeric support with more than three support legs. Moreover, various applications will benefit from the characteristics of the motor mount described herein.

Accordingly, the invention should be limited only by the spirit and scope of the appended claims.

I claim:

1. A mount for mounting a motor to a base, said mount comprising:

a one-piece elastomeric support having a motor attachment portion and a plurality of legs, each one of said legs extending from said motor attachment portion to terminate at a corresponding foot, wherein prior to being attached to said motor, said support is planar, and during use, said motor attachment portion is adapted for being disposed around said motor and each said foot is adapted for attachment to said base.

2. The mount recited in claim 1 further comprising a clamp disposed concentrically around said motor attachment portion of said support to compress said motor attachment portion against said motor.

3. The mount recited in claim 1 wherein each said foot has a width greater than the width of the corresponding leg and wherein said mount further comprises a plurality of brackets, each disposed across a corresponding one of said legs adjacent to the corresponding foot for fastening to said base.

4. The mount recited in claim 1 wherein said support comprises three legs.

5. A method of supporting a motor on a base comprising the steps of:

providing a one-piece elastomeric support having a motor attachment portion and a plurality of legs, wherein prior to being attached to said motor, said support is planar, each of said legs extending from said motor attachment portion to terminate at a corresponding foot, said support providing greater vertical stiffness than pivotal stiffness;

attaching said motor attachment portion to said motor; and attaching each of said plurality of legs to said base.

6. The method recited in claim 5 wherein said step of providing said support comprises the step of providing said support with three legs.

7. The method recited in claim 5 wherein said step of attaching said support to said motor comprises the steps of positioning said motor attachment portion around said motor and providing a clamp around said motor attachment portion to compress said motor attachment portion against said motor.

8. The method recited in claim 5 wherein said step of providing said support comprises the step of providing said feet with a greater width than said corresponding leg and wherein the step of attaching each of said plurality of legs to said base comprises the step of positioning a bracket across each of said legs adjacent to said corresponding foot and fastening said bracket to said base.

9. The method recited in claim 5 further comprising the step of attaching a centrifuge housing to said base.

* * * * *